US005516466A

United States Patent [19]
Schlesch et al.

[11] Patent Number: 5,516,466
[45] Date of Patent: May 14, 1996

[54] STEAM HUMIDIFIER SYSTEM

[75] Inventors: Ronald D. Schlesch, Three Rivers; Rex B. Cheskaty; Michael H. Gaines, both of Kalamazoo; Daniel R. Lane, Leonidas; Douglas K. Wagner, Three Rivers, all of Mich.

[73] Assignee: Armstrong International, Inc., Three Rivers, Mich.

[21] Appl. No.: 328,015

[22] Filed: Oct. 27, 1994

[51] Int. Cl.[6] ........ B01F 3/04

[52] U.S. Cl. ........ 261/117; 261/DIG. 76

[58] Field of Search ........ 261/DIG. 76, 117; 55/241

[56] References Cited

U.S. PATENT DOCUMENTS

| | | | |
|---|---|---|---|
| 669,558 | 3/1901 | Stoddard . | |
| 2,010,859 | 8/1935 | Huet . | |
| 2,186,125 | 1/1940 | Roberts . | |
| 2,237,417 | 4/1941 | Croft . | |
| 2,809,867 | 10/1957 | Dupasquier | 261/DIG. 76 |
| 2,949,239 | 8/1960 | Goyette . | |
| 3,096,817 | 7/1963 | McKenna . | |
| 3,134,657 | 5/1964 | Anderson . | |
| 3,353,800 | 11/1967 | Jens | 55/241 |
| 3,566,584 | 3/1971 | Ruthrof et al. . | |
| 3,642,201 | 2/1972 | Potchen | 261/DIG. 76 |
| 3,742,180 | 4/1973 | Morton et al. . | |
| 3,778,981 | 12/1973 | Ross . | |
| 3,857,514 | 12/1974 | Clifton . | |
| 3,870,484 | 3/1975 | Berg | 55/241 |
| 3,920,423 | 11/1975 | Ross . | |
| 4,345,916 | 8/1982 | Richards et al. . | |
| 4,384,873 | 5/1983 | Herr . | |
| 4,508,551 | 4/1985 | Ruoss et al. . | |
| 4,818,256 | 4/1989 | Ross . | |
| 4,913,856 | 4/1990 | Morton | 26/DIG. 76 |
| 5,126,080 | 6/1992 | Morton et al. . | |
| 5,372,753 | 12/1994 | Morton | 261/DIG. 76 |

FOREIGN PATENT DOCUMENTS

| | | | |
|---|---|---|---|
| 451261 | 9/1948 | Canada . | |
| 663306 | 8/1938 | Germany . | |
| 844011 | 7/1952 | Germany . | |
| 2325120 | 10/1974 | Germany | 261/DIG. 76 |
| 635416 | 12/1978 | Switzerland . | |

OTHER PUBLICATIONS

Series 6000 Coils, Catalog AH–112, by Armstrong–Hunt, Inc. pp. 12, 13, 19, 37, 47, 51 and 57, Aug., 1991.
Armstrong Bulletin No. 504–H, May, 1994.
The Humidification Specialists, Product Range brochure.
Steam–humidifier, Models DR73 and DL40 brochure, Technische Dokumentation, Nov., 1989.
Model 5–50 "Mini–Bank" brochure, pp. 10 and 11.
DriSteem Humidifier Company, STS, Product Application Bulletin, Form No. 1292–R5, Apr. 1992.
Model STS Steam–to–Steam Humidification System brochure, Form No. STS–0193–R5.
Dri–Steem Model STS brochure, Form No. DSH–STS–0587–R1, Apr. 1987.
Dri–Steem Steam Injection Humidifiers for Applications with a Steam Boiler brochure, pp. 1–7.
Vaporstream Electric Steam Humidifiers for Applications Without A Steam Boiler brochure, Form No. VSH–R5–0690–GL.

*Primary Examiner*—Tim R. Miles
*Attorney, Agent, or Firm*—Flynn, Thiel, Boutell & Tanis

[57] ABSTRACT

A steam humidifier system comprises a manifold for receiving steam and at least one steam dispersion tube extending from the manifold for receiving steam. Steam emitting nozzles on the dispersion tube are aimed into an air flow to be humidified. Preferably at least two baffle tubes are spaced upstream in an air flow from said dispersion tube and are offset laterally in opposite sides thereof transversely of the air flow. Air flow between said baffle tubes is directed thereby against an opposing flow of high velocity steam exiting the nozzles of the dispersion tube for rapid and even disbursement of steam into the air flow. An inner steam feed tube may extend from the manifold into and along the dispersion tube to feed steam to the remote end of the dispersion tube.

20 Claims, 7 Drawing Sheets

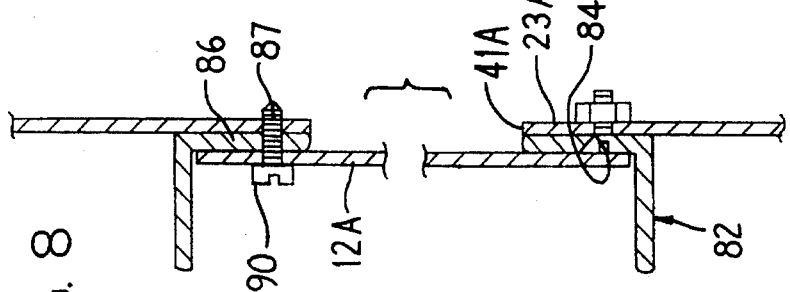
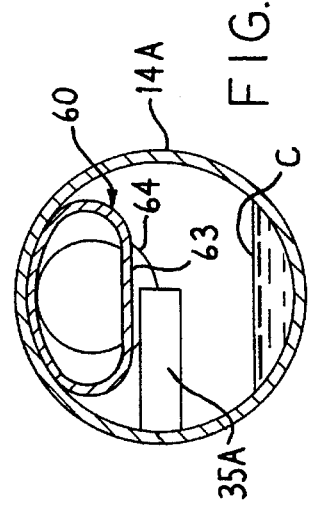
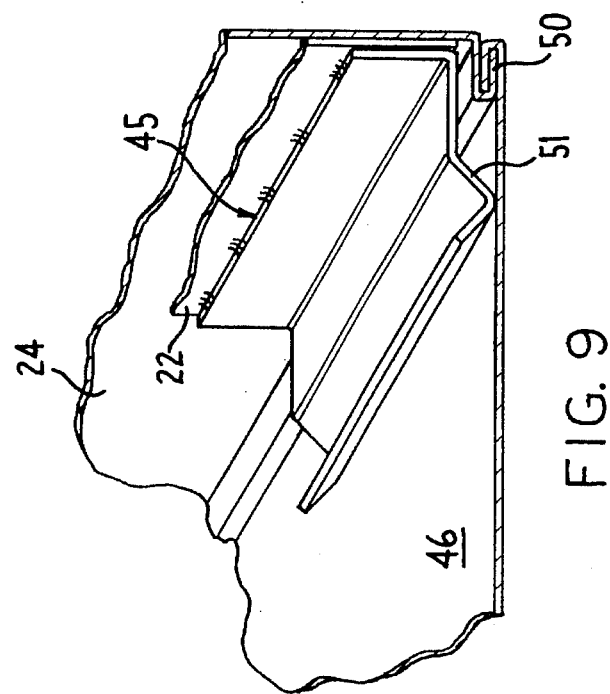
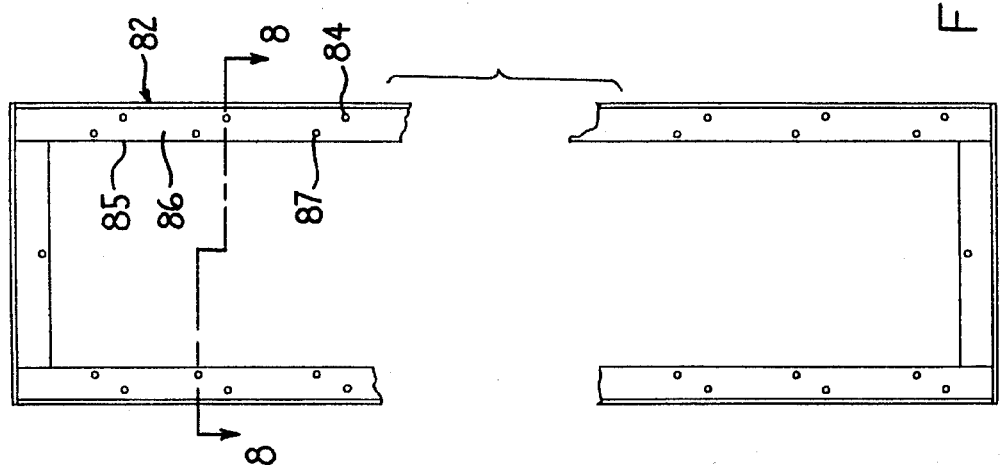

STEAM HUMIDIFIER SYSTEM

FIELD OF THE INVENTION

This invention relates to a steam humidifier system and more particularly relates to a steam humidifier system for humidifying air moving in a duct.

BACKGROUND OF THE INVENTION

The assignee of the present invention, Armstrong International, Inc. of Three Rivers, Mich. has manufactured steam humidifiers for several decades and has in recent years offered a variety of steam humidification equipment including the series 9000 and 1000 direct steam injection humidifiers, series EHU-600, 700, and HUMIDICLEAN (TM) electronic steam humidifiers and series CS-10 steam to steam humidifiers. These systems have been technically and commercially successful and continue to be. However, a continuing effort to improve an apparatus of this general kind is lead to the development of the present invention.

In particular, the present applicants have found that it is possible to reduce the so-called "impingement distance" by constructing a steam humidifier system in accord with the present invention.

In the humidification process, steam is discharged from a source as a "dry" gas. As it mixes with the cooler duct air, some condensation takes place, resulting in water particles becoming entrained in the airstream. After a distance these droplets are dispersed by and absorbed into the airstream. Such distance is the "impingement distance". Before the water particles are absorbed, such water particles can impinge on any equipment they contact, which tends to adversely affect the operation and/or service life of such equipment. Many applications can be satisfactorily handled by a steam humidifier system comprising of a single manifold with a direct steam injection humidifier or a single dispersion tube with a steam generator, for example of the above specified type marketed by the Assignee of the present invention. Frequently, however, performance and practicality dictate the use of multiple manifolds or dispersion tubes, which may be of the above specified types and which in the past have been assembled in the field, thereby tending to make installation more time consuming and increasing labor costs.

The present invention advantageously provides shorter impingement distances and avoids the need for assembly in the field.

Other objects, purposes and advantages of the present invention will be apparent to persons acquainted with apparatus of this general type upon reading the following specification and inspecting the accompanying drawings.

SUMMARY OF THE INVENTION

A steam humidifier system comprises a manifold for receiving steam and at least one steam dispersion tube extending from the manifold for receiving steam. Steam emitting nozzles on the dispersion tube are aimed into an air flow to be humidified. In one embodiment of the invention, at least two baffle tubes are spaced upstream in an air flow from said dispersion tube and are offset laterally in opposite sides thereof transversely of the air flow. Air flow between said baffle tubes is directed thereby against an opposing flow of high velocity steam exiting the nozzles of the dispersion tube for rapid and even disbursement of steam into the air flow. In another embodiment of the invention, the dispersion tube contains an inner steam feed tube.

BRIEF DESCRIPTION OF THE DRAWINGS

FIG. 2A is an enlarged central cross sectional view of one of the nozzles of FIG. 2, substantially as taken on the line 2A—2A of FIG. 4.

FIG. 6 is an enlarged sectional view substantially taken on the line 6—6 of FIG. 5.

FIG. 7 is a fragmentary elevational view taken from the exterior of the duct and showing a duct opening reinforcing frame for use on larger systems embodying the invention.

FIG. 8 is an enlarged sectional view substantially taken on the line 8—8 of FIG. 7.

FIG. 9 is an enlarged pictorial view of the inboard foot of FIG. 4.

DETAILED DESCRIPTION

Figure 1:
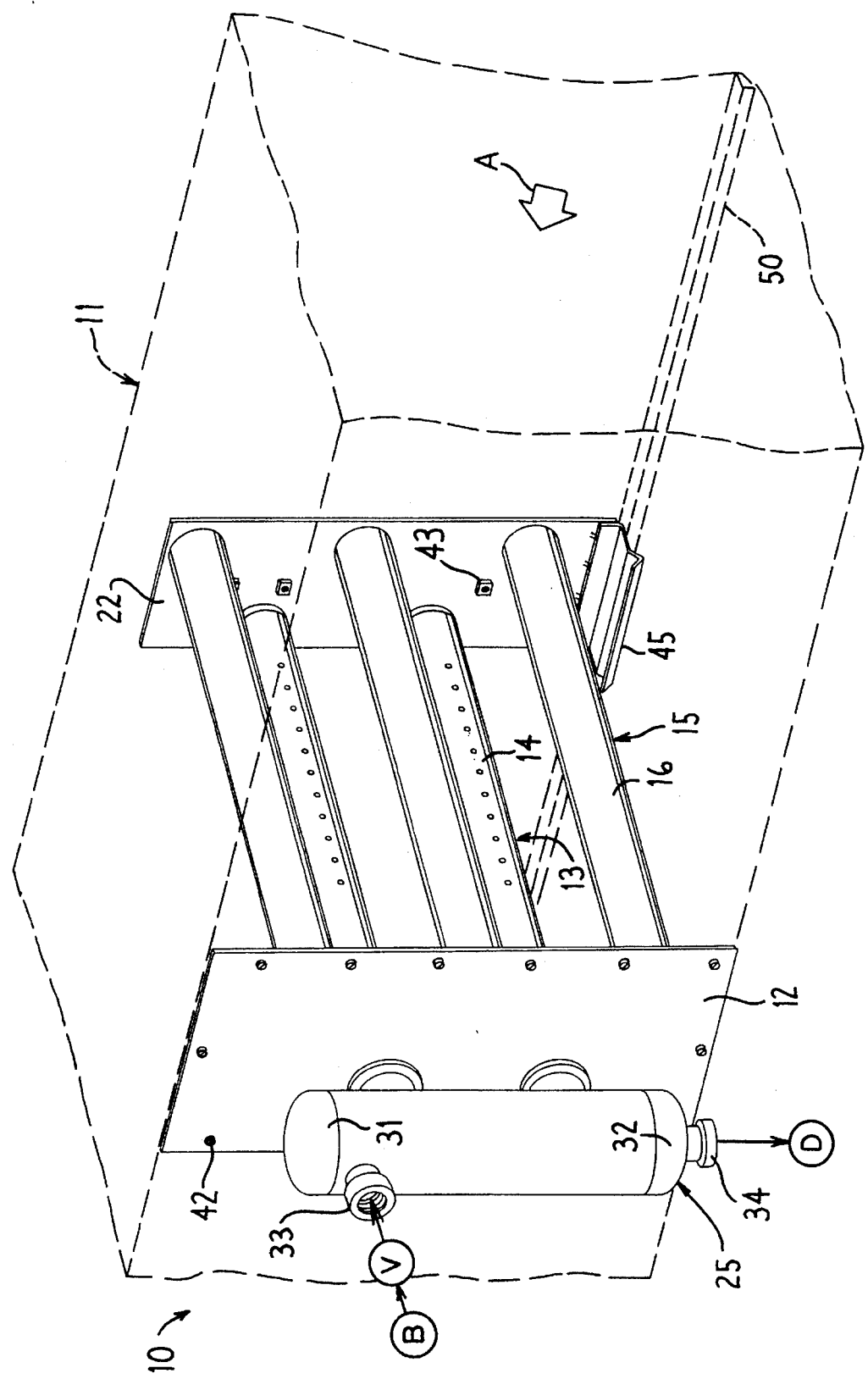
FIG. 1 is the pictorial view of a steam humidifier system embodying the present invention and installed for humidifying an airstream in a duct.

FIGS. 1–4 show a steam humidifier system 10 adapted for installation in a duct 11 through which is to flow air (for some other gas or combination of gases) to be humidified. The air flow is in the direction of the arrow A. The system 10 comprises an elongate header plate 12 from which perpendicularly extends an array 13 of steam dispersion tubes 14 and an array 15 of baffle members (preferably tubes) 16. In the FIG. 1 embodiment, the tubes 14 of the array 13 are coplanar, the tubes 16 of the array 15 are coplanar, the respective planes of the arrays 13 and 15 are parallel, and all of the tubes 14 and 16 are parallel. The plane of each array 13 and 15 is preferably perpendicular to the length direction of the duct 11 and hence perpendicular to the direction of air flow A therethrough. In the embodiment shown, the duct 11 extends horizontally, as do the tubes 14 and 16 which cross the horizontal width of the duct 11. The tubes 14 and 16 are preferably all of the same length.

The FIG. 1 system 10 may be referred to as a "horizontal" system in that the tubes 14 and 16 are intended to extend horizontally across the width of the air flow duct 11. In contrast, FIGS. 10 and 11 discloses a modified system, hereafter discussed, which may be termed a "vertical" system, in that the tubes extend vertically when installed in a horizontal duct. It will be noted that the invention may be used with ducts that extend vertically or at some other angle to the horizontal, as well as with the horizontal ducts illustrated in FIGS. 2 and 10.

Figure 2:
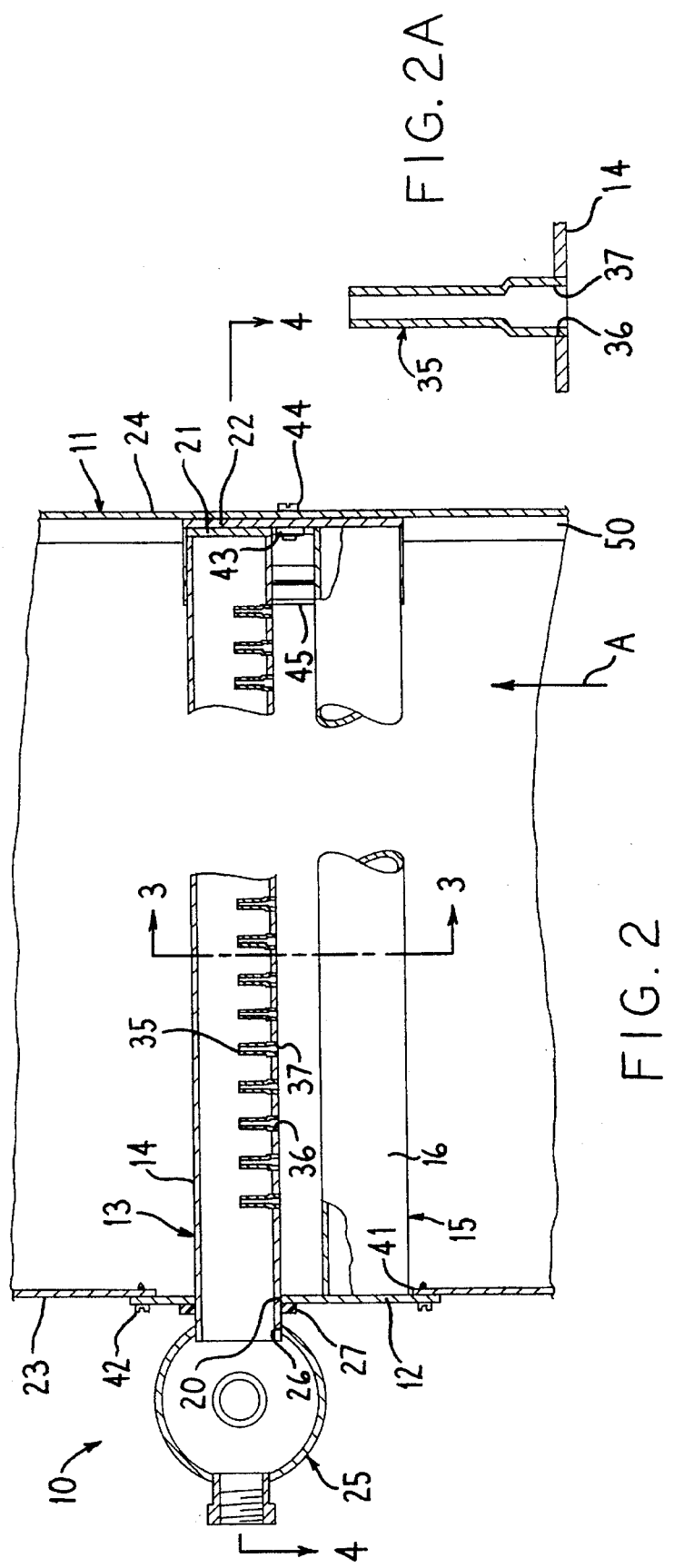
FIG. 2 is an enlarged, fragmentary, partially broken top view of the FIG. 1 system.
Figure 3:
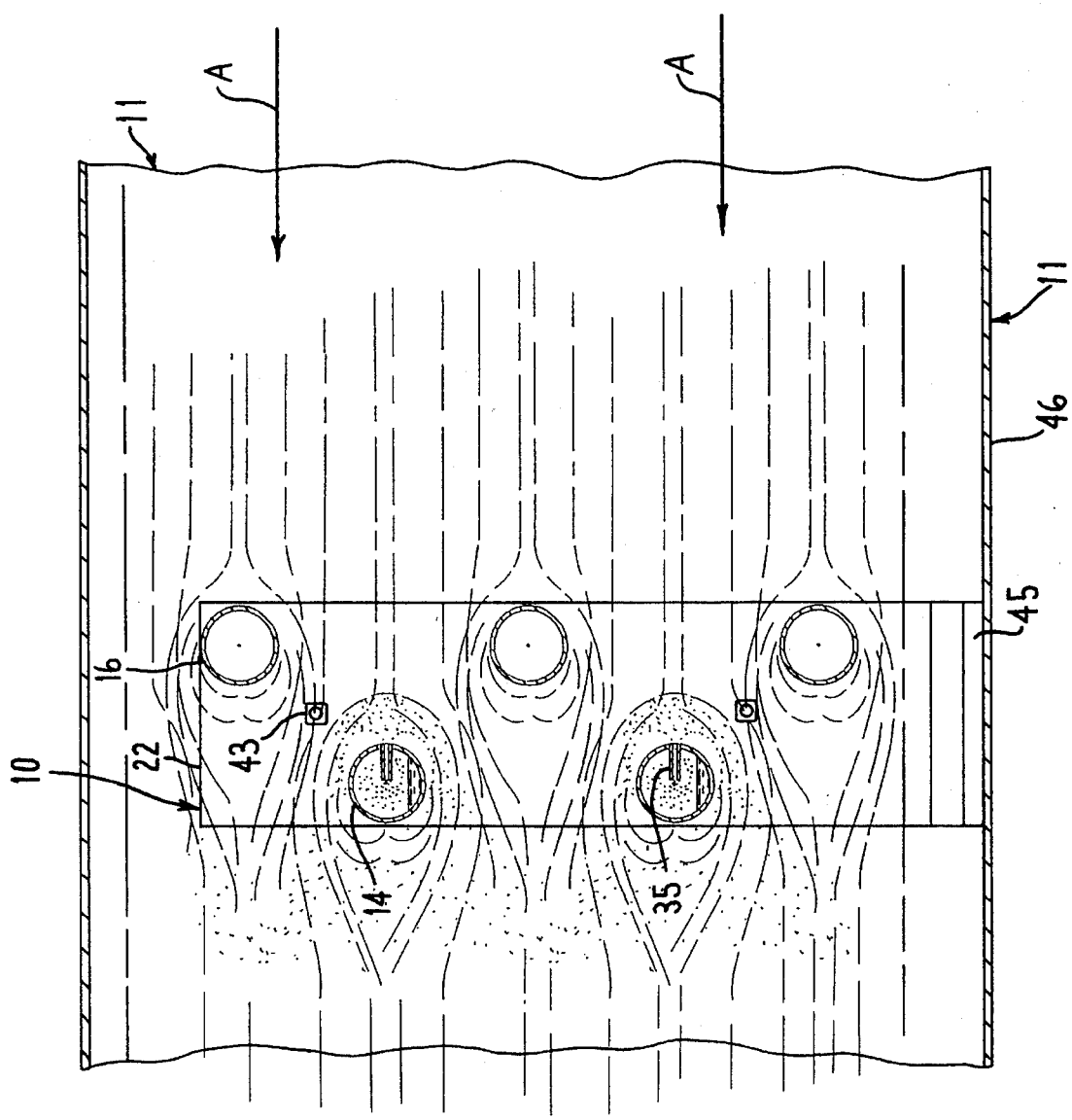
FIG. 3 is a sectional view substantially taken on the line 3—3 of FIG. 2.

The array 15 of baffle tubes 16 is spaced upstream (with respect to the air flow A) of the array 13 of dispersion tubes 14. The dispersion tubes 14 are, as most easily seen in the schematic cross sectional view of FIG. 3, staggered with respect to the baffle tubes 16. Note that for convenience in illustrating air flow in the schematic cross section of FIG. 3, the tube sizes and spacing differ slightly from that in FIGS. 1, 2 and 4. It will be noted that the number of baffle tubes 16 exceeds by one the number of dispersion tubes 14, such that each dispersion tube 14 is flanked by, spaced from, and offset downstream in the air flow from, a pair of baffle tubes 16, and such that the tubes 14 and 16 are in cross section placed in a substantially zig-zag manner with respect to each other, as generally indicated in FIG. 3.

The tubes 14 and 16 (FIG. 2) are fixed with respect to each other by fixation (as by spot welding) perpendicularly to the header plate 12. In the preferred embodiment shown, the dispersion tubes 14 extend through corresponding holes 20 in the header plate 12 and are spot welded thereto. The baffle tubes 16, on the other hand, abut the inside face of the header plate 12 and are spot welded thereto. The remote ends of the dispersion tubes 14 are closed by closure disks 21 fixed thereto, preferably by a circumferentially continuous welded securement.

To help prevent any tendency of the tubes 14 and 16 to bend in the air flow therepast and thereby to avoid any tendency for whipping movement or vibration of the tubes remote from the header plate 12, a support plate 22 (FIG. 2) extends perpendicular to and is fixed, preferably by spot welding, to the remote ends of the tubes 14 and 16. The support plate 22 is parallel to and spaced, transversely across the width of the duct 11, from the header plate 12. The tubes 14 and 16 are of length such that with the header plate 12 lying snugly along exterior surface of one duct side wall 23, the support plate 22 lies snugly along the interior surface of the opposite duct side wall 24.

A manifold, here a hollow header 25, is upstanding adjacent the outboard (leftward in FIGS. 1 and 2) face of the header plate 12. The header 25 has an upstanding longitudinal central axis which is coplanar with the longitudinal central axis of the dispersion tubes 14. The outboard ends (leftward in FIG. 2) of the dispersion tubes 14 extend snugly through holes 26 in the side wall of the hollow header 25. The dispersion tubes 14 extend only slightly into the header 25, sufficient to support the header 25 thereon. The dispersion tubes 14 are preferably circumferentially continuously welded to the outside of the header 25 in a leak-proof manner. The header 25 is spaced from the header plate 12 sufficient to snugly interpose therebetween an annular gasket 27 (FIG. 2). The gasket prevents leakage of air from the duct 11 outward between the edge of the hole 20 and the outside of the corresponding steam dispersion tube 14. The gasket 27 is of a material resistant to heat, sufficiently as to allow tack welding the interior face of the header plate 12 to each dispersion tube 14.

Top and bottom caps 31 and 32 respectively close the top and bottom ends of the header 25. The header 25 has, near the top thereof, an inlet fitting 33 (FIG. 1) for receiving steam. In the embodiment shown, such steam is supplied by conventional means, here schematically indicated by a conventional boiler B feeding steam through a conventional manually actuable valve V to the inlet fitting 31. Unlike some prior duct humidifier systems, it is not necessary to "dry" the steam (as in an expensive, conventional steam separator (not shown)), before feeding the steam to the inlet fitting 31. An outlet fitting 34 at the bottom of the header 25 drains condensate to a drain D.

A plurality of hollow tubular nozzles 35 (FIGS. 2, 2A and 4) are fixed in and spaced side-by-side along the length of each dispersion tube 14. Such nozzles 35 are parallel to each other and lie in a common radial plane of the corresponding dispersion tube 14, which plane is parallel to the duct air flow direction A. The nozzles 35 are elongate and extend from a point near the longitudinal central axis of the dispersion tube 14 radially toward the upstream end of the duct 11 so as to open through the side of the corresponding dispersion duct 14 directly into the air flow A. The nozzles 35 each have an outlet orifice 37 facing directly into the air flow A. The nozzles 35 are affixed in their corresponding dispersion tube 14 by any convenient means, such as a gas tight press fit of the radially outer end of each nozzle 35 in a corresponding hole 36 in the dispersion tube, as generally indicated in FIG. 2A.

The nozzles 35 are preferably spaced evenly along each dispersion tube 14. Nozzles are not located close to the header and support plates 12 and 22 and duct walls 23 and 24, to avoid condensation of steam emitted by the nozzles on the duct walls 23 and 24. Thus, the nozzles 35 closest to the plates 12 and 22 and duct walls 23 and 24 are eliminated, so that the distance from the nearest nozzle 35 to each plate 12 and 22 is preferably about 2 to 5 times the spacing of nozzles 35 along the length of the corresponding dispersion tube 14.

To avoid risk of condensation on the duct ceiling and floor, the tube arrays 13 and 15 do not extend to the duct ceiling and floor, but instead are preferably spaced therefrom by several tube diameters.

The header and support plates 12 and 22, dispersion and baffle tubes 14 and 16, and header 25 together form a prefabricated one-piece rigid unit, referred to above as the system 10, which is to be shipped to the customer ready for insertion in to a duct 11 on the customer's premises. To install the system 10 in a duct 11, a hole 41 (FIG. 2) is first cut in the side wall 23 of the duct. The hole 41 is preferably rectangular and sized to allow insertion of the support plate 22 and ducts 14 and 16 therethrough into the interior of the duct 11, but to overlap the header plate 12 around the entire periphery of the hole 41 for convenient fixing of the header plate 12 to the outside of the duct wall 23, by any convenient means such as screws 42. To avoid any tendency of the support plate 22 to slide along the abutting duct side wall 24, the two are preferably fixed together. In one unit according to the invention, nuts 43 (FIG. 2) were prefixed, as by welding, to the interior side of the support plate 22 for receiving screws 44 passing from outside the duct through the duct side wall 24. In this way, the support plate 22 cannot migrate downstream in the air flow A, so that the tubes 14 and 16 are maintained perpendicular to the length axis of the duct, and the abutting support plate 22 and duct side wall 24 do not vibrate with respect to each other and rattle.

If desired for any reason, the system 10 can be removed from the duct 11 by a reversal of the above mentioned installation steps.

In one unit constructed according to FIGS. 1, 2 and 4, the tubes 14 and 16 were about 2⅜ inches in outside diameter, the vertical spacing between center lines of adjacent tubes 14 of the array 13, and of adjacent tubes 16 within the array 15, was about twice the outside diameter of the tubes or a bit more (in one unit about) 6 inches, the height of the support plate 22 was about 17 inches (with the FIGS. 1–4 arrangement of two dispersion tubes 14 and three, baffle tubes 16), the height of the header plate was about 20 inches, the height of the header 25 (including the outlet fitting 34) was about 16½ inches, the spacing of the vertical central planes of the two arrays 13 and 15 was about 1 to 1½ times the tube diameter, and the sloped spacing from the outside of each dispersion tube radially to the outside surface of an adjacent baffle tube was about 0.8 to 1.0 times the outside tube diameter.

To at least help support the weight of the support plate 22 and of the tubes welded thereto, a foot 45 (FIGS. 2, 4 and 9) is fixed, as by welding, to the bottom of the support plate 22. The support plate 22 is spaced above the floor 46 of the duct in order to clear the usual folded corner-edge structure 50 where the duct side wall 24 meets the duct floor 46. The foot 45 (FIG. 9) extends from the support plate 22 inboard loosely over the top of the folded duct seam 50 and has an interior toe 51 which angles downward to contact and be vertically supported by the duct floor 46. In this way, the support plate 22 is vertically supported by the foot 45 on the floor 46 of the duct, and need not rely on the nuts 43 and screws 44 engaging the side wall 24 for vertical support. Folded duct seams, like the corner seam 50, are typically unpredictable in thickness and indeed vary in thickness along their lengths. Accordingly, it is not necessary to trim the bottom of the support plate 22 to match, or be complementary to, such a duct folded seam 50 and it suffices merely to provide a foot 45 of sufficient vertical extent as to allow the bottom of the support plate to clear even the most bulky of duct corner seams, including those whose major dimensions are vertical, rather than horizontal as shown in the present drawings, to allow the humidifier system 10 to be easily installed in a duct without regard to the corner seam structure of the duct.

Systems 10 according to FIGS. 1–4 have been constructed as small as about 1 foot high with a tube length of a foot or slightly less, using a single dispersion tube and two baffle tubes. On the other hand, systems as large as 6 feet high with tube lengths of up to 12 feet have been constructed. However, for larger systems and systems having higher steam flows, the more sophisticated FIGS. 5, 6 system 10A is preferred because it reduces energy loss by reducing steam condensation in the longer tubes, and more evenly distributes steam output along the length of the dispersion tubes and pushes the condensate along the dispersion tubes and into the manifold, as discussed below.

OPERATION

To install the system 10, the hole 41 is first cut in the side wall 23 of the duct and is sized and shaped to allow entry therethrough into the duct of the support plate 22, with its depending foot 45, while allowing the header plate 12 to overlap the duct side wall 23 around the entire perimeter of the hole 41. The humidifier system 10 is pushed fully into the duct until the support plate 22 bears on the far duct side wall 24 and the header plate 12 bears on the outside of the near duct side wall 23. The screws 42 and 44 are then installed to fix the plates 22 and 12, respectively, to the duct side walls 24 and 23, respectively. The header is then attached to the steam inlet valve V and drain D as schematically indicated in FIG. 1. These few simple steps complete installation of the humidifier system 10, and render it ready for use.

Given air flow through the duct 11, in the direction of the arrow A, steam is applied to the header 25 and passes therefrom into the dispersion tubes 14. The steam flow on the central axis of the dispersion tubes 14 is received under pressure from the boiler B and so is forced radially outward into the air flow A through the nozzles 35 (on FIG. 2).

A prior problem in humidification of an airstream in a duct has been unwanted condensation on duct surfaces and/or equipment downstream. More particularly, in prior systems, as humidification proceeds, steam is discharged from the manifold as a relatively "dry" gas. As it mixes with the cooler air flowing through the duct, some condensation tends to take place, resulting in water particles becoming entrained in the airstream. After a distance these droplets are dispersed by and absorbed into the airstream. Until they are absorbed, these particles can collect upon any equipment they contact, adversely affecting its operation and service life. Often it has not been possible to provide sufficient duct length between the point of steam injection into the airstream and downstream equipment that can be adversely affected by discreet water particles collecting thereon.

Prior use of multiple manifolds at the point of steam injection into the air duct has required substantial complexity and labor in on-site piping together of prior jacketed dispersion tubes of the type discussed in the BACKGROUND OF THE INVENTION section above.

These prior problems are avoided by the present invention under the present invention, steam enters each of the dispersion tubes 14 and flows through the nozzles 35 and out the forward facing orifices 36 thereof in a direction opposing the flow direction indicated by the arrow A. The air flow A first encounters the baffle tubes 16. As seen schematically in FIG. 3, the baffle tubes 16 change the flow pattern of the air by directing more air flow across the nozzle orifices 37 and increasing the velocity of such air. Air traveling downstream around each pair of baffle tubes 16 encounters the opposing flow of high velocity steam exiting the orifices of the dispersion tube nozzles 35. The more air per unit time that can be moved past each orifice, the greater amount of steam that can be absorbed within a given short distance downstream in the duct from the dispersion tube 14 providing such steam. A real key to reducing vapor trail length has thus been found to be to increase the velocity of the air flow past each nozzle so as to maximize the amount of air per unit time available to absorb moisture from the nozzle, on the principle that more air made available for the steam to become absorbed into, the less time it takes for the steam to be absorbed. The result is more uniform distribution and faster absorption of moisture into the air flow, resulting in shorter impingement distance than in past manifolds or dispersion tubes. The shorter impingement distance (shorter vapor trail) downstream from the dispersion tubes 14 advantageously permits, at a correspondingly shorter distance along the duct downstream of the dispersion tubes 14, a bend in the duct, a filter screen, or other equipment, without risk of water particles appearing on and damaging the surfaces of such duct bend, filter screen or other equipment.

In one unit constructed according to the invention, high pressure steam could be seen passing upstream into the air flow for an inch or two forward of its dispersion tube 14 and then being blown back in the direction of air flow around the corresponding dispersion tube 14 and disappearing from visibility about 18 inches beyond the dispersion tubes in the downstream direction of air flow. In that particular example, air velocity was about 1800 feet per minute. Plume length (length of visible steam vapor beyond the dispersion tubes 14) downstream of the air flow will vary somewhat depending on flow velocity, air temperature, pounds per hour of steam injected and size of the duct cross section in width and height.

The present invention is usable under widely varying conditions, air flow and steam delivery rate.

Whereas in a very small cross-section duct, the humidifier system 10 would tend to include a single dispersion tube 14 and two baffle tubes 16, the length and number of tubes would increase to serve larger duct cross sections, the spacing and diameter of the tubes 14 and 16 remaining generally the same regardless of the number of tubes.

Placing the inlet end of the nozzle 35 at or nearly at central axis of the dispersion tube 14 places the radially inner (inlet) end of the nozzle in the driest portion of the steam supply, or in other words, at the location most remote from any condensate that may tend to form on the interior wall of the dispersion tube. Such condensation will tend to gravitate to the lowest portion of the interior wall of the dispersion tube. Since the dispersion tubes 14 are to be located substantially horizontally in the FIG. 1–4 embodiment, and at least with the remote end of each dispersion tube 14 no lower than its end connected to the header 25, steam condensing in each dispersion tube 14 will tend to run along the bottom portion of the interior wall of the dispersion tube and through the open end of the dispersion tube into the header 25, to then drop by gravity to the bottom of the header for removal through the outlet 34. The positive support of the support plate and inboard tube ends by the foot, on the duct floor, assures that the remote tube ends will not tend to sag downwardly and thereby allow puddling of water in the closed remote ends of the dispersion tubes 4.

While in the preferred embodiments shown, the nozzles 35 parallel each other and the duct length and their orifices 37 open directly toward the airstream A, it is contemplated that in some instances nozzles may instead be aimed at an acute angle to the airstream A, e.g. angled toward or even somewhat downstream of an adjacent baffle tube.

MODIFICATION

Figure 5:
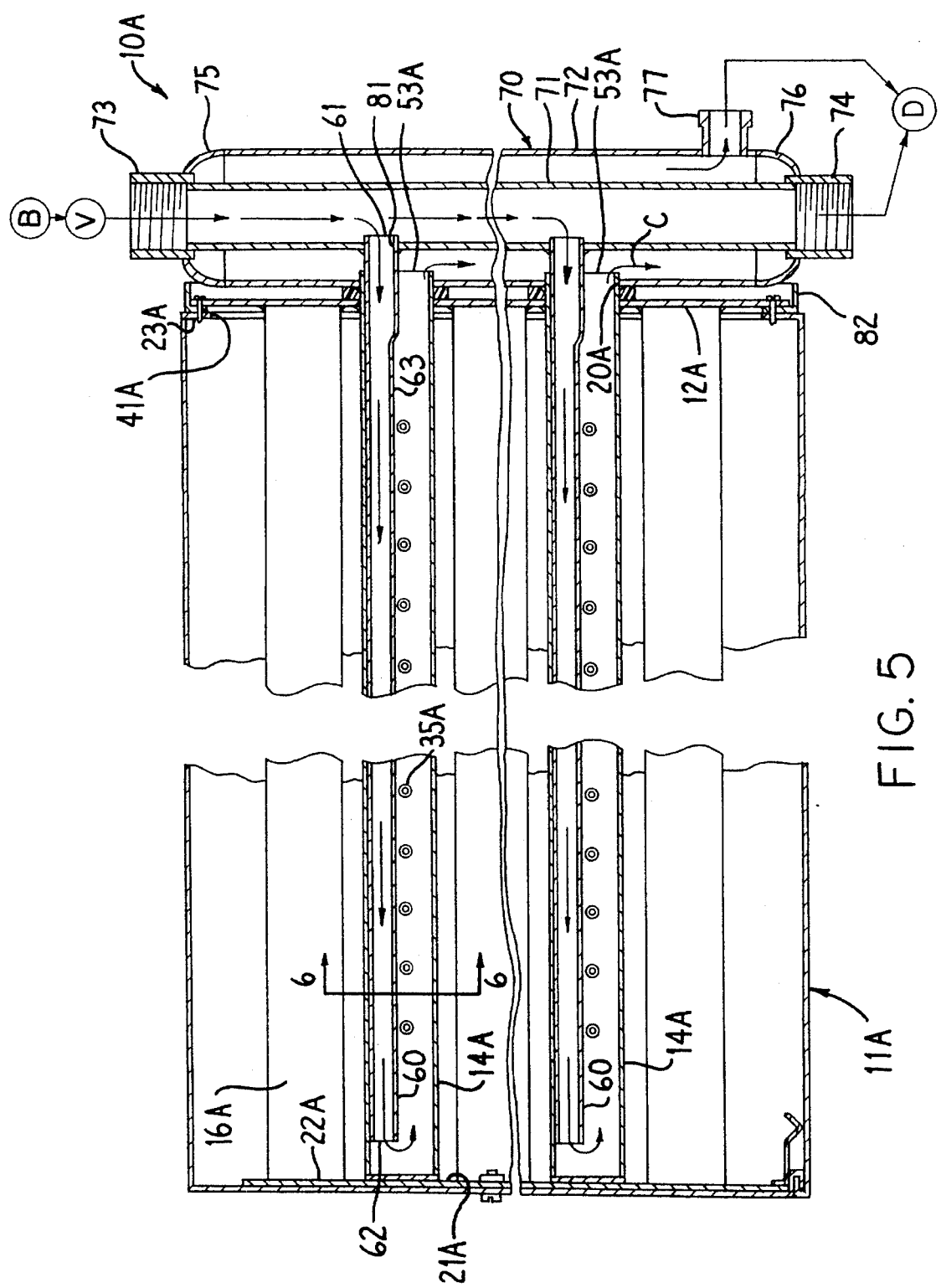
FIG. 5 is a view generally similar to FIG. 4 but showing a modification.

FIGS. 5 and 6 show a modified system 10A disposed in a duct 11A. The modified system 10A is similar to the above-described system 10 except as follows.

The structural modifications in the FIG. 5 system 10 are particularly advantageous for systems having longer tube lengths and higher steam flows. More particularly, the longer the dispersion tube 14A, the farther steam must travel within the tube to reach the nozzles adjacent the remote end of the tube and the greater the opportunity for loss of heat from the steam to the externally air cooled walls of the dispersion tube.

To avoid these problems, each dispersion tube 14A has an inner steam feed tube 60 fixed eccentrically therein, preferably occupying the topmost interior portion of such dispersion tube 14A, above the nozzles 35A. The inner steam feed tube 16 may be fixed to the interior surface of the top portion of the dispersion tube 14A by any convenient means, such as spot resistance welds spaced along the length thereof and not here shown. The steam feed tube 60 has a near (right end in FIG. 5) end 61 which protrudes from the near end 53A of the corresponding dispersion tube 14A. The inner steam feed tube 60 has a far end (left end in FIG. 5) which opens to the interior of the dispersion tube 14A near the closure disk 21A thereof. For short distance into the near end portion of the dispersion tube 14A, the inner steam feed tube 60 is of circular cross section, as seen in FIGS. 5 and 6. However, in the particular embodiment shown, the bottom 63 of the inner steam feed tube 60 is flattened throughout the major length thereof, from the far end 62 to a location just inside the header plate 12A. As seen in FIG. 6, the flattening of the bottom 63 of the inner steam feed tube 60 spaces its bottom above the nozzles 35A to avoid interference with steam feed into the nozzles, and provides the major length interior portion of the inner steam feed tube 60 with a somewhat D-shaped cross section. Such D-shaped cross section contrasts with the circular cross section of the near portion 64 of the inner steam feed tube.

Figure 4:
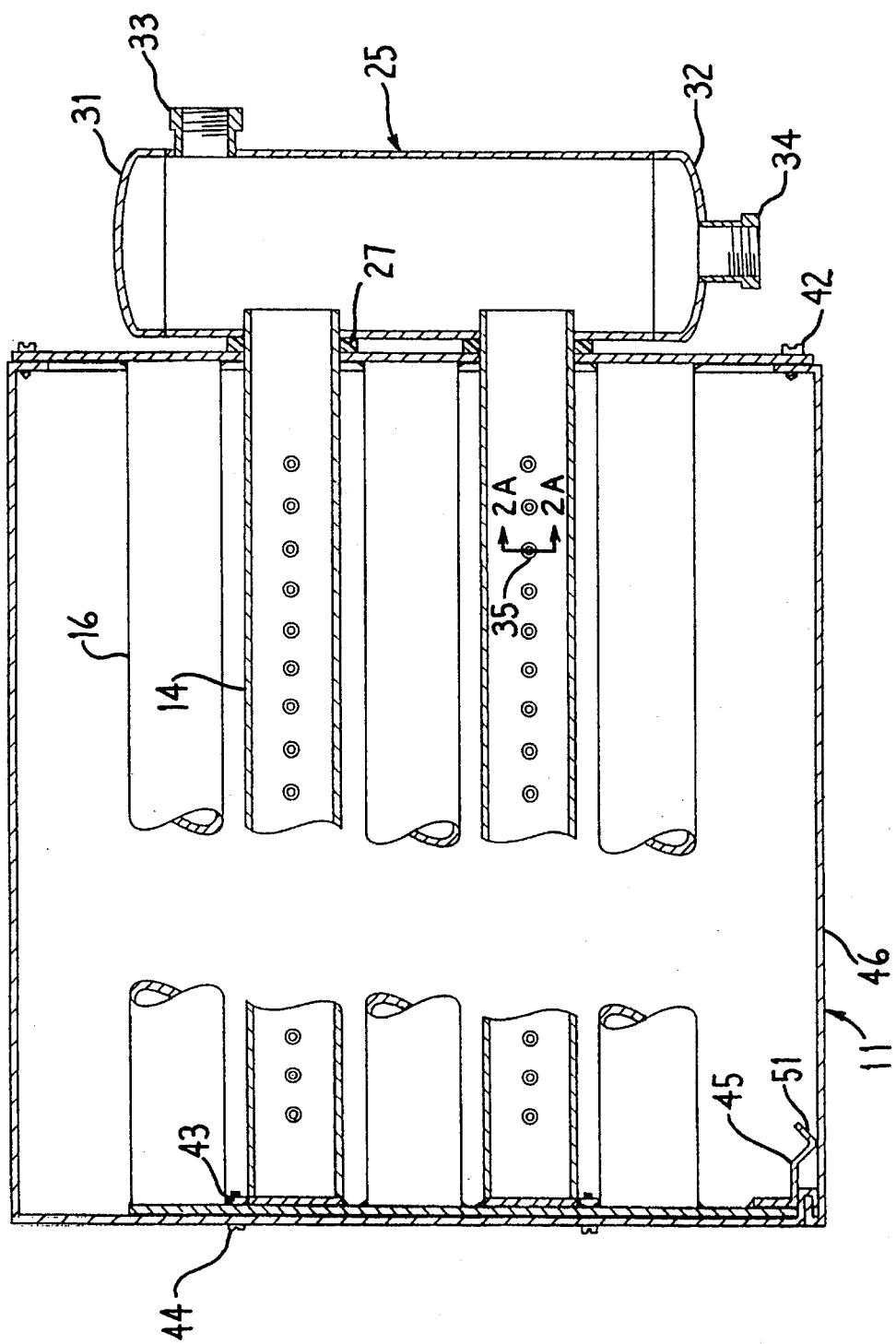
FIG. 4 is a sectional view substantially taken on the line 4—4 of FIG. 2.

To provide for separate feeding of relatively dry steam into the near end 61 of the inner steam feed tube 60 and output of condensate from the near end 53A of the steam dispersion tube 14A, the header 25 of FIG. 4 is replaced in FIG. 5 by an annular two passage manifold 70 comprising a generally tubular interior header 71 loosely surrounded by a radially outer housing 72. The inner header 71 terminates in top and bottom nipples 73 and 74 connectable by any convenient means, such as by conventional threaded connections, to the steam inlet valve V and condensate drain D respectively, as schematically indicated in FIG. 5. The outer housing 72 surrounds the inner header 71, preferably coaxially therewith, and is closed at its top and bottom ends 75 and 76. A condensate outlet nipple 77 communicates between the bottom interior portion of the outer housing 72 and the condensate drain D. The near end 61 of the inner steam feed tube 60 communicates sealingly and fixedly with the interior of the inner header 71 for receiving steam therefrom. The near end 53A of the steam distribution tube 14A communicates sealingly and fixedly with the annular interior of the outer housing 72, outside the inner header 71, for draining any condensate that may form within the steam distribution tube 14A into the annular interior of the outer housing 72 for removal through the condensate outlet nipple 77 to the drain D.

In this same way, each of the steam dispersion tubes 14A of the FIG. 5 system 10A is preferably provided with such an inner steam feed tube 60, and with its steam feed tube 60 is similarly connected to the outer housing 72 and the inner header 71, respectively, of the manifold 70.

The near ends of the steam dispersion tubes 14A preferably are connected to the header plate 12A as above described with respect to corresponding parts of the FIG. 4 embodiment. The near end 61 of each inner steam feed tube 60 is fixedly and sealingly connected with the inner header 71 by any convenient way. One way for doing so is by oven brasing (which somewhat cumbersomely requires placement of the entire system 10A in a large oven, after placement of brasing material at the juncture of the inner steam feed tubes 60 and inner header 71). Another way is by welding through the opening 20A in the outer housing 72 through which the near end 53A of the corresponding steam dispersion tube 14A is later to be inserted. Still another way is by insertion of the near end 61 of the inner steam feed tube 60 in press fit relation into a carefully sized hole 81 in the inner header 71 when the near end 53A of the corresponding steam dispersion tube 14A is welded to the outer housing 72.

The operation of the embodiment of FIGS. 5 and 6 is similar to that above described with respect to the FIG. 1–4 embodiment, except as follows.

Steam is fed through the valve V into the inner header 71 (FIG. 5) and thus into the near ends 61 of each of the inner steam feed tubes 60. The inner steam feed tubes 60 thus carry the essentially dry steam nearly to the remote ends of the surrounding dispersion tubes 14A. Steam thus entering each dispersion tube 14A at its remote end (left end in FIG. 5), from the far outlet end 62 of the inner steam feed tube 60, and moves back along the interior of the dispersion tube 14 to feed steam out of the nozzles 35A thereof.

Condensate collecting on the interior wall of the dispersion tube 14A, due to cooling of the outside of the dispersion tube 14A by airflow through the duct 11A, tends to collect in the bottom portion of the dispersion tube 14A, as schematically indicated at C in FIG. 6, to drain from the near end 53A of the dispersion tube 14A, as indicated by the arrow at C in FIG. 5, to drain into the annular interior of the outer housing 72 and thence through the nipple 77 to drain D. In view of the containment of incoming dry steam in the inner feed tube 60 almost throughout the entire length of the dispersion tube 14A and virtually to the remote end thereof, incoming dry steam has much less risk of being contaminated by droplets of condensate collecting in the steam dispersion tube 14A, despite the substantial length of the latter in the FIG. 5 embodiment. Further, the hot, dry steam within the inner steam feed tube 60 helps to keep warm the steam entering the nozzles 35A along the length of the dispersion tube 14A and so reduces the amount of incoming steam that is wastefully converted to condensate within the dispersion tube 14A.

The flattening of the bottom of the inner steam feed tubes 60 is indicated at 63. Thus, the inner steam feed tubes 60 are of sufficient interior cross section as to efficiently deliver dry steam to the remote end of the corresponding dispersion tube 14A, without interfering with the space around the interior ends of the nozzles 34A in which steam gathers to enter the nozzles.

Relatively large systems 10A are correspondingly heavier than smaller systems 10 of the kind shown in FIG. 4. Accordingly, it is desirable to reenforce, for such larger systems, the hole 41A in the near duct side wall 24A through which the tubes 14A and 16A of the system 10A are inserted into the duct 11A. To this end, a rigid frame 82 is readily and economically constructed of conventional steel, L-shaped cross section, material, elongate side pieces thereof being welded to transverse top and bottom pieces thereof in the manner generally indicated in FIG. 7. The frame 82 is held against the duct side wall 23A and its interior can be used to cut the hole 41A in the duct side wall. The frame 82 can then be fixed to the duct side wall by nut-and-bolt fasteners 83 (or other fasteners, such as sheet metal screws), through holes 84 in the coplanar flanges 86 of the frame 82.

The tubes 14A and 16A and support plate 22A can then be inserted through the frame 82 and hole 41A into the duct 11A in much the same manner as described above with respect to the embodiment of FIGS. 1–4. This brings the header plate 12A to rest against the outside of the coplanar flanges 86 of the frame 82. Such coplanar flanges 86 are provided with holes 87 located adjacent to the inboard edge of such coplanar flanges 86, and inboard of the above mentioned holes 84. The pattern of inboard holes 87 is preferably matched by a corresponding array of through holes along the perimeter of the header plate 12A to allow insertion of self tapping screws 90 (FIG. 8) through the perimeter portion of the header plate 12A to thread into the inboard holes 87 in the frame 82, so as to rigidly fix the system 10A in the duct 11A.

The foregoing systems 10 and 10A can be constructed in mirror image form for insertion through the right hand side (looking downstream in the duct) of the duct rather than on the left side of the duct as shown in FIGS. 1–9.

Figure 11:
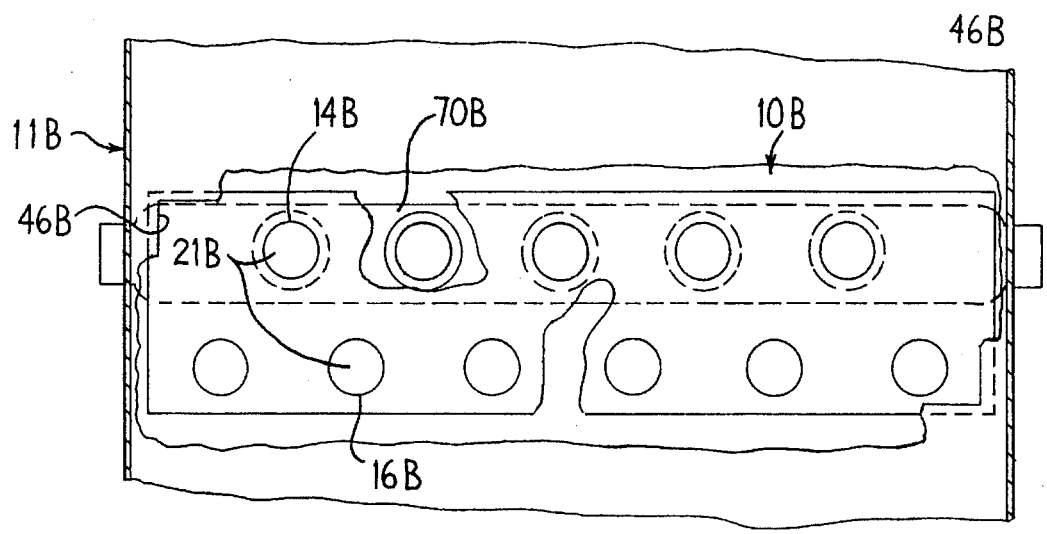
FIG. 11 is a partially broken sectional view substantially as taken on the line 11—11 of FIG. 10.
Figure 10:
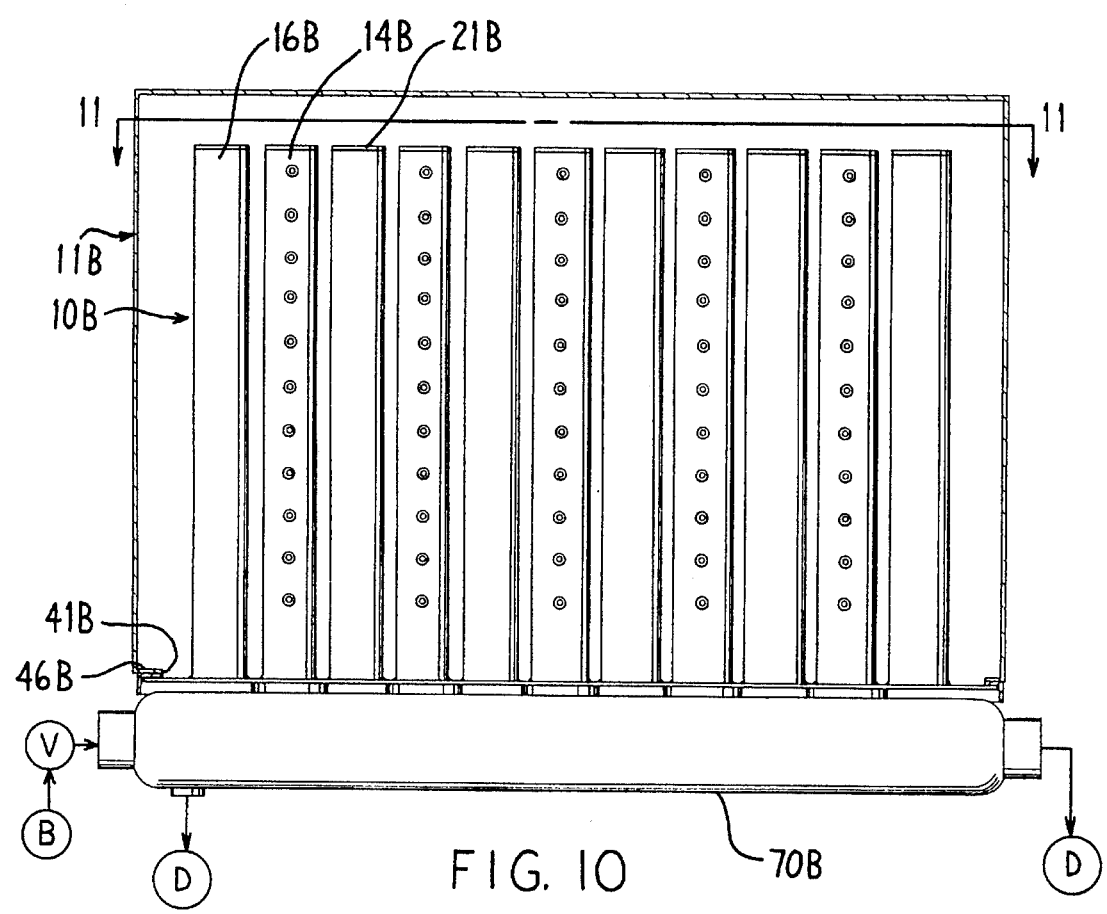
FIG. 10 is a front elevational view showing a modification.

FIGS. 10 and 11 show a further modification in which a system 10B, embodying the invention, is installable through a hole 41B in the bottom of a duct 11B, so that the dispersion and baffle tubes 14B and 16B extend upwardly through the duct floor 46B, rather than through a duct side wall as discussed above with respect to FIGS. 1–9. The modified FIG. 10 and 11 system 10B is similar in structure and operation to the systems 11 and 11A above described except as follows. More particularly, although the system lib when used in relatively small cross section ducts is preferably patterned after the FIG. 4 system 11, for larger ducts (as here shown) and/or higher steam flows, the modified system 10B is preferably similar to the system 11A of FIG. 5 above discussed.

The system 11B thus has its tubes 14B and 16B inserted upward through the hole 41B in the floor 46B of the duct 11B so that such tubes are substantially vertical and extend upward from the corresponding manifold 70B. Such a bottom mounted system 11B may be desired, for example, when the presence of other equipment adjacent the side walls of the duct interferes with side insertion of a system like the systems 11 and 11A of FIGS. 4 and 5.

Further, because the tubes 14B and 16B are upstanding in the duct 11B, from their bottom mounted manifold 70B, they are not subject to the gravitational bending forces that would be felt by tubes horizontally cantilevered from a vertical header as in FIGS. 4 and 5. Accordingly, it has been found that the remote (upper) free ends of the tubes 14B and 16B need not be joined or fixed to the upper duct wall which conveniently permits omission of any remote support plate joined to the free ends of the tubes, as in the FIG. 4 and 5 systems above described. Thus, in the upstanding tube system 10B of FIGS. 10 and 11, the remote (upper) ends of all of the tubes 14B and 16B are preferably closed by closure disks 21B like those at 21 in FIG. 2, to prevent collection of condensation in the baffle tubes 16B.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A steam humidifier system, for humidifying an air flow in a duct comprising:

an elongate hollow manifold for receiving steam from a steam source;

at least one steam dispersion tube extending from said manifold and communicating therewith for receiving steam therefrom, said dispersion tube being exposed to an air flow to be humidified;

steam emitting nozzles on said dispersion tube and aimed to project steam into an air flow to be humidified;

said steam dispersion tube containing a substantially smaller cross-section inner steam feed tube extending axially therein from said manifold to an open free end adjacent a blind end of said steam dispersion tube remote from said manifold, so that steam is injected into said steam dispersion tube at its end remote from said manifold, said manifold comprising an inner steam supply header surrounded loosely by an elongate outer condensate return housing, said steam dispersion tube having one end connected to said condensate return housing, the inner steam feed tube being, at least through most of its length, laterally crushed substantially to a D-shaped cross section having an enlarged radius curved side arranged to lie close to the side of the corresponding steam dispersion tube diametrally opposite the side carrying said nozzles, said substantially D-shaped cross section inner steam feed tube having a flattened face facing toward said nozzles.

2. A steam humidifier system, for humidifying an air flow in a duct comprising:

an elongate hollow manifold for receiving steam from a steam source;

at least one steam dispersion tube extending from said manifold and communicating therewith for receiving steam therefrom, said dispersion tube being exposed to an air flow to be humidified;

steam emitting nozzles on said dispersion tube and aimed to project steam into an air flow to be humidified;

baffle members arranged in a first array spaced upstream in an air flow from said dispersion tube and means for fixing said first array with respect to said dispersion tube, said baffle members of said first array having spaced laterally therebetween and downstream therefrom said dispersion tube, such that air flow deflection and turbulence caused by the baffle members of the first array results in rapid and even disbursement of steam into the air flow leaving the system, said baffle members being baffle tubes of diameter and length similar to said dispersion tubes.

3. The apparatus of claim 2 in which the tubes are between about 2 and 2½ inches in outside diameter, wherein the common central plane of the dispersion tubes is about 3 to 4 inches away from the central plane of the baffle tubes, and wherein the adjacent dispersion tubes are about 5 to 10 inches apart on center.

4. A steam humidifier system, for humidifying an air flow in a duct comprising:

an elongate hollow manifold for receiving steam from a steam source;

at least one steam dispersion tube extending from said manifold and communicating therewith for receiving steam therefrom, said dispersion tube being exposed to an air flow to be humidified;

a rigid, open center, closed periphery frame for mounting on a wall of a duct carrying airflow to be humidified and for framing a hole through a duct wall to allow insertion of remote ends of said tubes into airflow in a duct, said humidifier system including a header plate to be removably fixed to said frame, said header plate fixedly carrying said arrays of tubes to extend therefrom through the frame and into the airflow in such a duct.

5. The apparatus of claim 4 in which said manifold is located on the opposite side of said header plate and frame from said dispersion tubes.

6. A humidifying system for humidifying air flow in a duct, the system comprising:

a manifold for supplying steam;

a dispersion tube extending from said manifold for insertion into an air flow to be humidified;

steam emitting nozzles on said dispersion tube and aimed to project steam into an air flow to be humidified;

an inner steam feed tube having one end connected to said manifold for receiving steam therefrom and extending axially in said dispersion tube from said manifold to an open free end adjacent a blind end of said steam dispersion tube, so that steam is injected into said steam dispersion tube at its end remote from said manifold, said steam feed tube being eccentrically located in said dispersion tube and circumferentially spaced from said nozzles, said nozzles being elongate and each extending from a point near the longitudinal central axis of said dispersion tube radially outward toward and opening through the peripheral wall of said dispersion tube, a series of said elongate nozzles being spaced side-by-side and occupying a plane extending radially and longitudinally of said dispersion tube, said steam supply tube lying to one side of said series of elongate nozzles and of said plane thereof and extending in skewed relation to said elongate nozzles, said elongate nozzles each extending transversely along one side of said steam supply tube, the opposite side of said steam supply tube snugly facing the interior surface of said dispersion tube to one side of said nozzles.

7. The apparatus of claim 6 in which the cross section of said inner steam feed tube is substantially less than the cross section of said dispersion tube, said dispersion tube having a path along its length for returning condensate to said manifold, wherein steam from the open free end of said inner steam feed tube tends to push ahead of it any condensate in said dispersion tube toward said manifold.

8. The apparatus of claim 6 in which said nozzles are aimed to project steam into an air flow to be humidified, said nozzles being aligned substantially parallel with such air flow and open directly upstream into such air flow.

9. A humidifying system for humidifying air flow in a duct, the system comprising:

a manifold for supplying steam;

a dispersion tube extending from said manifold for insertion into an air flow to be humidified;

steam emitting nozzles in said dispersion tube;

an inner steam feed tube having one end connected to said manifold for receiving steam therefrom and extending axially in said dispersion tube from said manifold to an open free end adjacent a blind end of said steam dispersion tube, so that steam is injected into said steam dispersion tube at its end remote from said manifold, in which the inner steam feed tube is, at least through most of its length, laterally crushed substantially to a D-shaped cross section having an enlarged radius curved side arranged to lie close to the side of the corresponding steam dispersion tube diametrally opposed to the side carrying said nozzles, said substantially D-shaped cross section inner steam feed tube having a flattened face facing toward said nozzles and spaced therefrom by a clearance space for unimpeded steam flow into said nozzles.

10. A steam humidifier system, for humidifying an air flow in a duct comprising:

an elongate hollow manifold for receiving steam from a steam source;

a plurality of steam dispersion tubes extending in side-by-side, substantially parallel relation from said manifold and communicating therewith for receiving steam therefrom, said dispersion tubes being exposed to an air flow to be humidified;

steam emitting nozzles on said dispersion tubes and aimed to project steam into an air flow to be humidified;

baffle tubes arranged in a first array spaced upstream in an air flow from said dispersion tubes and means for fixing said first array with respect to said dispersion tubes, said baffle tubes of said first array having spaced laterally therebetween and downstream therefrom said dispersion tubes, such that air flow deflection and turbulence caused by the baffle tubes of the first array results in rapid and even disbursement of steam into the air flow leaving the system, said dispersion tubes being arranged in a second array, said dispersion tubes array being spaced downstream from said baffle tubes array, successive ones of said dispersion tubes being disposed evenly between and spaced downstream and laterally from the adjacent pair of baffle tubes such that a given said baffle tube and the adjacent pair of dispersion tubes are located at the three apices respectively of a triangle as seen from the tube ends, said dispersion tubes and baffle tubes together being the apices of a zig-zag pattern as seen from the tube ends.

11. The apparatus of claim 10 in which the nozzles of the dispersion tube aim in a direction between an adjacent pair of baffle tubes and thereby toward an air inlet side of said system for ejecting steam into the air flow between the adjacent pair of baffle tubes, such that the air flow between said adjacent pair of baffle tubes encounters an opposing flow of high velocity steam exiting the nozzles of the corresponding dispersion tube.

12. The apparatus of claim 10 in which said dispersion tube and baffle members extend vertically upward away from said manifold.

13. The apparatus of claim 10 in which said dispersion tube and baffle members extend horizontally away from said manifold.

14. The apparatus of claim 10 in which the tubes are between about 2 and 2½ inches in outside diameter, wherein the common central plane of the dispersion tubes is about 3 to 4 inches away from the central plane of the baffle tubes, and wherein the adjacent dispersion tubes are about 5 to 10 inches apart on center.

15. The apparatus of claim 10 in which the space occupied by the first and second tube arrays, taken together, in the direction of air flow, is less than 3 times the outside diameter of the largest of said tubes.

16. The apparatus of claim 10 in which said nozzles extend from the center of the corresponding steam dispersion tube to and include an orifice opening through the peripheral wall of said dispersion tube.

17. The apparatus of claim 16 in which the end of said steam dispersion tube remote from said manifold is closed and wherein steam condensing within the dispersion tube is allowed to flow by gravity along the walls of the dispersion tube back toward said manifold.

18. A steam humidifier system, for humidifying air flow in a duct, comprising:

an elongate hollow manifold for receiving steam from a steam source;

at least one steam dispersion tube extending from said manifold and communicating therewith for receiving steam therefrom, said steam dispersion tube being exposed to an air flow to be humidified;

steam emitting nozzles in said dispersion tube and aimed to project steam into an air flow to be humidified;

elongate substantially cylindrical baffle members of exterior cross-sectional shape and size generally similar to that of said dispersion tube, said baffle members being arranged in a first array spaced upstream in an air flow from said dispersion tube and means for fixing said first array with respect to said dispersion tube, said baffle members of said first array having spaced laterally therebetween and downstream therefrom said dispersion tube, such that air flow deflection turbulence caused by the baffle members of the first array results in rapid and even dispersement of steam into the air flow leaving the system.

19. The apparatus of claim 18 in which said steam dispersion tube contains a substantially smaller cross-section inner steam feed tube extending axially therein from connection to said manifold to an open free end adjacent a blind end of said steam dispersion tube remote from said manifold, so that steam is injected into said steam dispersion tube at its end remote from said manifold, said steam feed tube being eccentrically located in said dispersion tube and circumferentially spaced from said nozzles.

20. The apparatus of claim 18 in which the space occupied by the first and second tube arrays, taken together, in the direction of air flow, is less than 3 times the outside diameter of the largest of said tubes.

* * * * *